United States Patent
Narayanan et al.

(10) Patent No.: US 7,108,934 B2
(45) Date of Patent: Sep. 19, 2006

(54) PROTON CONDUCTING MEMBRANES FOR HIGH TEMPERATURE FUEL CELLS WITH SOLID STATE "WATER FREE" MEMBRANES

(75) Inventors: Sekharipuram R. Narayanan, Arcadia, CA (US); Shiao-Pin S. Yen, Altadena, CA (US)

(73) Assignee: California Instituite of Technology, Pasadena, CA (US)

( * ) Notice: Subject to any disclaimer, the term of this patent is extended or adjusted under 35 U.S.C. 154(b) by 465 days.

(21) Appl. No.: 10/346,812

(22) Filed: Jan. 17, 2003

(65) Prior Publication Data

US 2003/0148162 A1  Aug. 7, 2003

Related U.S. Application Data

(60) Provisional application No. 60/349,562, filed on Jan. 18, 2002.

(51) Int. Cl.
*H01M 8/10*  (2006.01)

(52) U.S. Cl. .......................... 429/33; 429/30; 204/295

(58) Field of Classification Search ...................... None
See application file for complete search history.

(56) References Cited

U.S. PATENT DOCUMENTS

| 4,376,030 | A * | 3/1983 | Ezzell et al. | 204/296 |
| 6,465,136 | B1 * | 10/2002 | Fenton et al. | 429/309 |
| 6,841,285 | B1 * | 1/2005 | Wilkinson et al. | 429/33 |

* cited by examiner

*Primary Examiner*—Patrick Joseph Ryan
*Assistant Examiner*—Julian Mercado
(74) *Attorney, Agent, or Firm*—Daniel L. Dawes; Myers Dawes Andras & Sherman LLP

(57) ABSTRACT

A "water free," proton conducting membrane for use in a fuel cell is fabricated as a highly conducting sheet of converted solid state organic amine salt, such as converted acid salt of triethylenediamine with two quaternized tertiary nitrogen atoms, combined with a nanoparticulate oxide and a stable binder combined with the converted solid state organic amine salt to form a polymeric electrolyte membrane. In one embodiment the membrane is derived from triethylenediamine sulfate, hydrogen phosphate or triflate, an oxoanion with at least one ionizable hydrogen, organic tertiary amine bisulfate, polymeric quaternized amine bisulfate or phosphate, or polymeric organic compounds with quaternizable nitrogen combined with Nafion to form an intimate network with ionic interactions.

3 Claims, 1 Drawing Sheet

PROTON CONDUCTING MEMBRANES FOR HIGH TEMPERATURE FUEL CELLS WITH SOLID STATE "WATER FREE" MEMBRANES

RELATED APPLICATIONS

The present application is related to U.S. Provisional Patent Application, Ser. No. 60/349,562, filed on Jan. 18, 2002, which is incorporated herein by reference and to which priority is claimed pursuant to 35 USC 119.

The invention described herein was made in the performance of work under a NASA contract and is subject to the provisions of Public Law 96-517 (U.S.C. 202) in which the Contractor has elected to retain title.

BACKGROUND OF THE INVENTION

1. Field of the Invention

The invention relates to fuel cells and in particular to polymer electrolyte membranes in fuel cells capable of operating at temperatures in excess of 120° C.

2. Description of the Prior Art

A fuel cell is an electrochemical device which reacts a fuel and an oxidant to produce electricity and water. A typical fuel supplied to a fuel cell is hydrogen, and a typical oxidant supplied to a fuel cell is oxygen (or ambient air). Other fuels or oxidants can be employed depending upon the operational conditions and type of fuel cell The basic process in a fuel cell is highly efficient, and for those fuel cells fueled directly by hydrogen, pollution free. Further, since fuel cells can be assembled into stacks of various sizes, power systems have been developed to produce a wide range of electrical power outputs and thus can be employed in numerous industrial applications. The teachings of prior art patents, U.S. Pat. Nos. 5,242,764; 6,030,718; 6,096,449, are incorporated by reference herein.

A fuel cell produces an electromotive force by reacting fuel and oxygen at respective electrode interfaces which share a common electrolyte. For example, in proton exchange membrane (PEM) fuel cells, the construction of same includes a proton exchange membrane which acts not only as an electrolyte, but also as a barrier to prevent the hydrogen and oxygen from mixing. One commercially available proton exchange membrane is manufactured from a perfluorcarbon material which is marketed under the trademark Nafion, and which is sold by the E. I. DuPont de Nemours Company. Proton exchange membranes may also be purchased from other commercial sources. As should be understood, the proton exchange membrane is positioned between, and in contact with, the two electrodes which form the anode and cathode of the fuel cell.

In the case of a PEM type fuel cell, hydrogen gas is introduced at a first electrode (anode) where it reacts electrochemically in the presence of a catalyst to produce electrons and protons. The electrons are circulated from the first electrode to a second electrode (cathode) through an electrical circuit which couples these respective electrodes. Further, the protons pass through a membrane of solid, polymeric electrolyte (a proton exchange membrane or PEM) to the second electrode (cathode). Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water. This reaction further completes the electrical circuit.

The following half cell reactions take place:

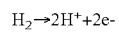

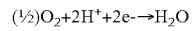

As noted above the hydrogen or fuel-side" electrode is designated as the anode, and the oxygen (skip "side") electrode is identified as the cathode. The external electric circuit conveys the generated electrical current and can thus extract electrical power from the cell. The overall PEM fuel cell reaction produces electrical energy which is the sum of the separate half cell reactions occurring in the fuel cell less its internal losses.

Polymer electrolyte membrane fuel cells are promising as power sources for transportation applications. In recent years, great strides have been made in the development of reformate-air fuel cells. Perfluorinated ionomeric membranes such as Nafion®) have been widely used in PEM fuel cells as electrolytes due to the excellent stability, high ionic conductivity and mechanical strength that these polymeric materials offer. This is particularly true for stack operation below 120° C.

More recently, there is a new emphasis on increasing the temperature of fuel cell operation to 150° C. or even as high as 200° C. so that carbon monoxide tolerance can be enhanced from the current levels of 100 ppm to 10,000 ppm. However, at temperatures greater than 120° C., the water retentivity of Nafion-type membranes is poor. Consequently, the ionic conductivity of Nafion suffers resulting in poor fuel cell performance.

Thus, an alternate membrane that retains high conductivity at temperatures as high as 200° C. is needed.

It is also important that such a membrane exhibits sufficient thermal and electrochemical stability and favorable interfacial properties for electro-reduction of oxygen and electro-oxidation of hydrogen.

BRIEF SUMMARY OF THE INVENTION

The illustrated embodiment of the invention is a "water free," proton conducting membrane for use in a fuel cell comprising a highly conducting sheet of converted solid state organic amine salt. The converted solid state organic amine salt is a acid salt of organic amine with tertiary nitrogen atoms, combined with a nanoparticulate oxide and a stable binder combined to form a polymeric electrolyte membrane.

In several embodiments the membrane is derived from organic amine salt with bisulfate, hydrogen phosphate, or an oxoanion containing at least one ionizable hydrogen. For example, in a first type the solid state organic amine salt comprises organic tertiary amine bisulfate, or hydrogen phosphate. In a second type the solid state organic amine salt comprises polymeric quaternized amine bisulfate or triflate, or hydrogen phosphate. In a third type the solid state organic amine salt comprises polymeric organic amine combined with Nafion to form an intimate network with ionic interactions.

In one embodiment the "water free," proton conducting membrane for use in a fuel cell is fabricated in a method comprising the steps of preparing triethylenediamine bisulfate, triflate or phosphate salts in fine particulate form; combining the prepared triethylenediamine bisulfate, triflate or phosphate salts with nanoparticulate oxides and Teflon®; and processing the combined materials into membranes.

In the second embodiment the method comprises of steps of providing a condensation polymer poly {1,4-xylenyl} piperazine; and quaternizing the condensation polymer poly {1,4-xylenyl} piperazine with bisulfate or hydrogen phosphate to obtain a molecular structure given by

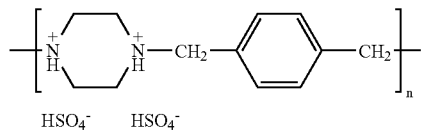

The step of providing a condensation polymer poly {1,4-xylenyl} piperazine comprises preparing a bis-N,N'-(phenyldiemthylsilyl)-derivative of piperazine, condensing this silyl derivative with xylenyl dichloride to result in the condensation polymer, casting a polymer film from chloroform, and acidifying the film to produce a quaternized membrane. By controlling the degree of quaternization we select the mechanical properties and ionic conductivity of the membrane.

In another embodiment the method comprises the steps of providing poly-4-vinyl pyridine bisulfate prepared by the "spontaneous" polymerization of the monomeric salt of 4-vinyl pyridine in polar solvents through ionically-induced reactions initiated by the anion of the salt to result in the chemical structure shown below,

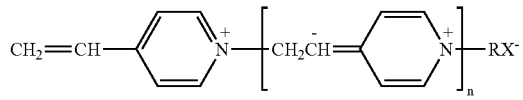

and casting the poly-4-vinyl pyridine bisulfate into the form of a membrane. Yet another embodiment comprises of combining poly-4-vinyl pyridineand poly-2-vinyl pyridine with sulfuric acid and phosphoric acid to produce bisulfate and hydrogen phosphate oxoanion salts. These oxoanions have an ionizable proton that can participate in proton conduction. The structure of these substances is shown below. Insert structure as shown below:

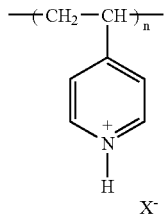 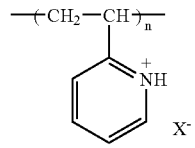

Poly-4-vinylpyridinium salt     Poly-2-vinylpyridinium salt where X is a bisulfate or hydrogen phosphate anion.

In still another embodiment the method comprises the step of incorporating a tertiary nitrogen containing polymer with Nafion ionomer to cast a two component polymer system by casting films from solutions to produce a proton conducting membrane.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
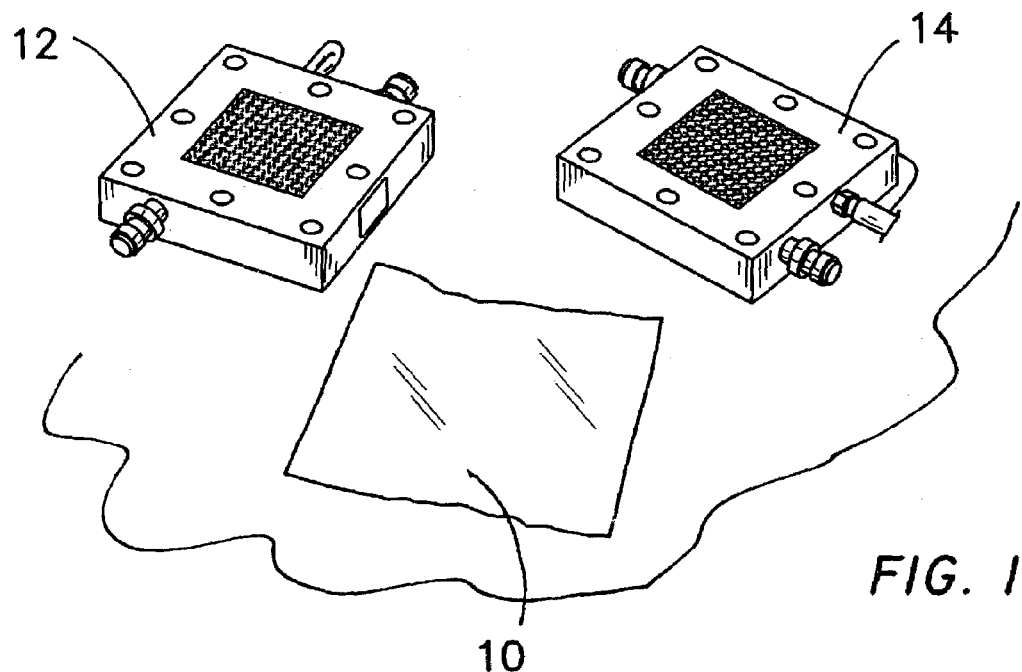
FIG. 1 is a photograph of a fuel cell membrane made according to the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Research efforts reported in the literature on the development of high temperature proton conducting membranes has hitherto focused on two types of ion-conducting polymeric materials. The first type uses ionomeric materials such as pefluorosulfonyl imides, poly perfluorosulfonic acid, sulfonic acid of polyether ether ketones, and polyphenylene-sulfide sulfonic acid that are inherently stable at high temperature, however are still strongly dependent on water being present for proton conduction. Therefore, water retention at 120° C. is still poses a challenge with this type of membrane. One of the advantages of membranes formulated according to the invention is their lack of dependence on water for proton conduction and hence their use over a wide operating range of temperatures.

The second type exploits the ionic mobility of protons in free acids such as phosphoric acid, sulfuric acid, or heteropolyacids. These acids are imbibed in an electrochemically robust polymer matrix such as polybenzimidazole (PBI) or Nafion to produce an ionically conducting membrane. This type of membrane is more resistant to water loss than plain Nafion, but poses issues with migration, redistribution and volatility of the free acid in addition to adsorption of anions and corrosion.

The approach of the illustrated embodiment to solve the high temperature membrane problem described above is to design a membrane that does not rely on water for proton conduction. Unlike conventional proton conductors this type of "water-free" electrolyte will conduct protons by a hopping and reorganization process.

In proton conductors that contain water or phosphoric acid the proton is transported by free rotation and translation of these molecules and hence such proton transport is termed the "vehicle" mechanism. However, when such mobile transporters are absent the proton is transported by cleavage and re-forming of hydrogen bonds with simultaneous reorganization of the polymer structures. In such a mode of proton transport, the proton appears to hop from site to site as defects are created in the matrix by re-organization processes. Such a mechanism may be termed a "hopping and re-organization" mechanism or historically the Grotthuss mechanism.

While such a "liquid like" proton conduction in solid state organic amine salts was studied in the early 1970s, there is no thought of using them in fuel cells. The illustrated embodiment discloses methods of converting such organic amine salts to highly conducting fuel cell membranes. Also disclosed is the polymer analogs of "quaternizable" nitrogen as a new electrolyte system that conducts protons without the need for water to be present.

Consider first the acid salts of triethylenediamine with two tertiary nitrogen atoms that can be "quaternized" in which "water-free" proton conduction is realizable. Studies on the proton conductivity of these organic amine salt materials was first reported in 1976 although their application to fuel cells has never before been considered. We have demonstrated that by combining such a proton conductor with nano-particulate oxides (for example silica) and a stable binder (such as Teflon®), polymeric electrolyte membranes can be realized inexpensively. FIG. 1 is a photograph of membranes 10 fabricated according to the invention, which in the illustrated embodiment is from triethylenediamine sulfate or poly vinyl pryridinum bisulfate. Membrane 10 is shown lying next to two fuel conventional cell halves 12 and 14 in a disassembled configuration.

Figure 2:
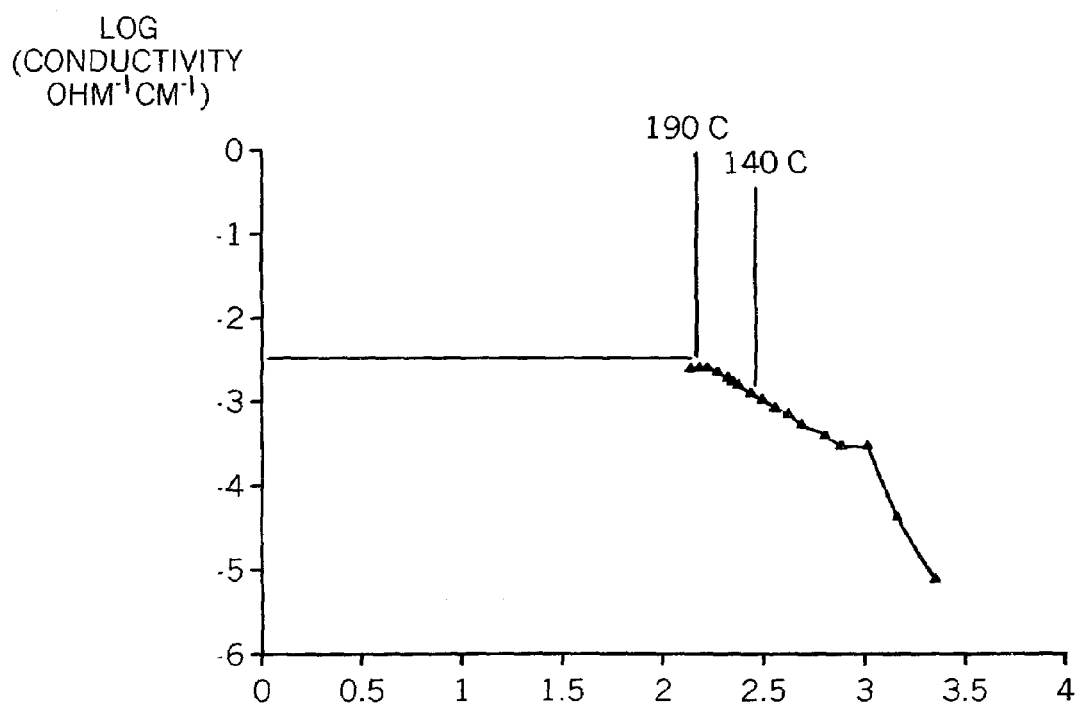
FIG. 2 is a graph showing proton conductivity of a triethylenediamine sulfate membrane as a function of temperature.

The results of ionic conductivity measurements made on such membranes 10 are shown in the graph of FIG. 2. These results show that specific conductivity values as high as 0.005 S cm$^{-1}$ can be realized at 190° C. under "water-free" conditions Also the activation energy for proton transport, obtained from the slope of the curve in FIG. 2, is in the range of 0.15–0.2 eV indicating facile proton transport. These research results also indicate that when properly configured, "liquid like" proton transport can be realized in such solid-state "water-free" proton conductors. Also, the membranes 10 shown in FIG. 1 demonstrate the possibility of converting particulate ionic substances or salts into membranes. Other membrane compositions include hydrogen phosphate or an oxoanion with at least one ionizable hydrogen.

Other types of "water free" proton conducting membranes that incorporate quaternary nitrogen atoms include:

Type I: Organic tertiary amine bisulfate and hydrogen phosphate;

Type II: Polymeric quaternized amine bisulfate, trifiate or hydrogen phosphate;

Type III: Polymeric quaternizable amines combined with Nafion to form an intimate network with ionic interactions.

For Type I materials triethylenediamine bisulfate, triflate and phosphate salts in fine particulate form are prepared and combined with nanoparticulate oxides and Teflon®, and processed into membranes 10 of the type shown in FIG. 1 In a typical is formulation for triethylenediamine bisulfate 3.5 gm of amine, 4.9 g of sulfuric acid and 0.862 g of Teflon are used. A mixture comprised of the organic amine and Teflon particles in methanol is added dropwise into a solution of sulfuric acid in methanol. As a result of the reaction an organic amine bisulfate is formed as a precipitate. This salt and the Teflon in suspension are recovered and washed free of acid with excess methanol, dried in a vacuum oven and then expanded into a membrane by the using a sheer force applied by a roller.

For Type II materials two polymeric systems are possible: First, we synthesize the condensation polymer poly {1,4- xylenyl} piperazine and quaternize with bisulfate or hydrogen phosphate. The chemical structure of the resulting polymer is shown below:

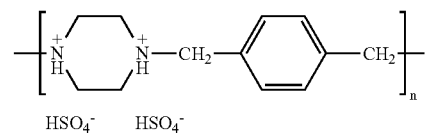

The preparation will be carried out in two steps. In the first step bis-N,N'-(phenyldiemthylsilyl)-derivative of piperazine is prepared. This silyl derivative is condensed with xylenyl dichloride to result in the condensation polymer. The polymer film is then cast from chloroform, and then acidified to produce the quaternized membrane 10. The degree of quaternization can be controlled to achieve appropriate mechanical properties and ionic conductivity.

In a typical preparation, equimolar quantities of phenyldimethyldicholoro silane and piperazine are dissolved in a polar solvent. The condensation polymerization results in formation of hydrogen chloride which is removed in order to realize the pure polymer. In the next step the polymer is combined with a stoichiometric amount of sulfuric or phosphoric acid to produce the required quaternized acid salt. The degree of quaternization can be varied from 10% to 100% by varying the amount of acid used in the reaction. Higher degrees of quaternization are desirable for efficient proton conduction. A hundred fold excess of acid usually results in complete quaternization.

Secondly, a second membrane material that will be fabricated is of poly-4-vinyl pyridine bisulfate. This polymer will be prepared by the "spontaneous" polymerization of the monomer, 4-vinyl pyridine. The polymerization occurs in polar solvents through ionically-induced reactions initiated by the anion of the salt resulting in the chemical structure shown below.

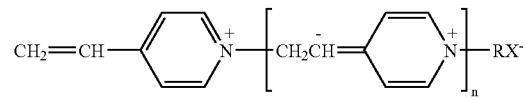

The poly-4-vinyl pyridine bisulfate will then be cast into membrane 10. This membrane 10 incorporates the anion in the polymer during synthesis and will not require a separate quaternization step. In a typical example, 10 grams of 4-vinyl pyridine will be combined with about 100 grams of sulfuric acid to initiate the spontaneous polymerization. The reaction will be carried out in methanol solution. The resulting polymer shown above is recovered from the methanol solution as it is precipitated.

Yet another embodiment of a proton conductor comprises poly-4-vinyl pyridinium and poly-2-vinyl pyridinium salts with bisulfate and hydrogen phosphate anions. These anions have an ionizable proton that can participate in proton conduction. The structure of these substances is shown below.

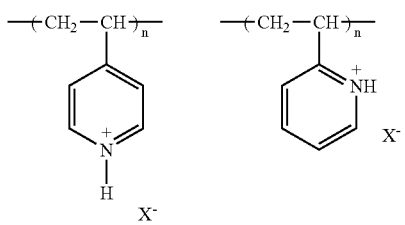

where X is bisulfate or hydrogen phosphate anion.

For this type of poly vinyl pyridinium salt, the respective polyvinyl pyridine is dissolved in methanol and combined with a hundred fold excess of the acid that can generate the appropriate anion species, for example sulfuric or phosphoric acids. In a typical example 1 gram of polyvinylpyridine is combined with 100 grams of sulfuric acid. This ensures complete quaternization of the nitrogen sites. The resulting precipitate of polyvinylpyridinium salt is washed with excess methanol, vacuum dried. To prepare a membrane, a concentrated solution of the polyvinylpyridinium salt is prepared in water and brushed on to a porous inert polymer substrate and allowed to dry. Such porous substrates include glass, polybenzoxazole, aramid and polybenzimidazole. Such a composite membrane structure can then be used as a proton conducting electrolyte.

For Type III materials the membrane formulation incorporates proton conducting quaternary nitrogen containing polymer (of Type II b) with Nafion ionomer to cast a two-component polymer system. This type of formulation takes advantage of the strong acidity of dry Nafion and its flexible polymer backbone. The general objective of such a two-component system is to increase the number of sites available for proton hopping and allow for additional relaxation and re-organization mechanisms in order to reduce barrier heights during proton transport. Such two component polymer membranes 10 can be fabricated by casting films from solutions.

In a typical preparation of the type III material, 1 equivalent of the quaternizable amine containing polymer such as polyvinyl pyridine (equivalence being calculated based on the number of quaternizable nitrogens), and 1 equivalent of the Nafion (the equivalence calculated based on the sulfonic acid groups) is combined in a suitable polar solvent such as dimethyl formamide, n-methylpyrrolidone or methanol to form an adduct, Alternately, excess Nafion as high as 1.5 equivalents can be used. The resulting solution or gel will be cast into a membrane.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A "water free," proton conducting membrane for use in a fuel cell comprising a highly conducting sheet of converted solid state polymeric or composite organic amine salt formed from a tertiary amine and an oxoacid with at least one ionizable proton, combined with nanoparticulate silica and polytetrafluoroethylene (PTFE) to create a membrane, where the converted solid state organic amine is a converted acid salt of triethylenediamine with two quaternized tertiary nitrogen atoms.

2. The membrane of claim 1 where the acid salt of triethylenediamine comprises triethylenediamine bisulfate.

3. A "water free," proton conducting membrane for use in a fuel cell comprising a highly conducting sheet of converted solid state polymeric or composite organic amine salt formed from a tertiary amine and an oxoacid with at least one ionizable proton, combined with nanoparticulate silica and polytetrafluoroethylene (PTFE) to create a membrane, where the solid state organic amine salt comprises hydrogen phosphate.

* * * * *